(12) United States Patent
Vasiljev et al.

(10) Patent No.: US 12,123,390 B2
(45) Date of Patent: Oct. 22, 2024

(54) WIND TURBINE BLADE MANUFACTURE

(71) Applicant: Vestas Wind Systems A/S, Aarhus N (DK)

(72) Inventors: Sergei A. Vasiljev, Herning (DK); Pavel Drozdov, Ulyanovsk (RU)

(73) Assignee: Vestas Wind Systems A/S, Aarhus N. (DK)

( * ) Notice: Subject to any disclaimer, the term of this patent is extended or adjusted under 35 U.S.C. 154(b) by 200 days.

(21) Appl. No.: 17/785,974

(22) PCT Filed: Dec. 17, 2020

(86) PCT No.: PCT/DK2020/050373
§ 371 (c)(1),
(2) Date: Jun. 16, 2022

(87) PCT Pub. No.: WO2021/121512
PCT Pub. Date: Jun. 24, 2021

(65) Prior Publication Data
US 2023/0016975 A1 Jan. 19, 2023

(30) Foreign Application Priority Data

Dec. 20, 2019 (DK) .......................... PA 2019 70829

(51) Int. Cl.
*F03D 80/30* (2016.01)
*F03D 1/06* (2006.01)

(52) U.S. Cl.
CPC ........... *F03D 1/0675* (2013.01); *F03D 80/30* (2016.05); *F05B 2230/10* (2013.01);
(Continued)

(58) Field of Classification Search
CPC ...... F03D 1/0675; F03D 80/50; F03D 80/502; F05B 2230/10; F05B 2230/80;
(Continued)

(56) References Cited

U.S. PATENT DOCUMENTS

| | | | |
|---|---|---|---|
| 11,118,573 B2* | 9/2021 | Badger | F03D 80/50 |
| 2011/0031758 A1 | 2/2011 | Mitsuoka et al. | |
| 2023/0323864 A1* | 10/2023 | Tobin | F03D 80/50 |
| | | | 416/230 |

FOREIGN PATENT DOCUMENTS

| | | |
|---|---|---|
| CN | 110541164 A | 12/2019 |
| KR | 101770339 B1 | 8/2017 |

(Continued)

OTHER PUBLICATIONS

Danish Patent and Trademark Office, Search and Examinatoin Report in PA 2019 70829, Jul. 10, 2020.

(Continued)

*Primary Examiner* — Sang K Kim
(74) *Attorney, Agent, or Firm* — Wood Herron & Evans LLP (57) ABSTRACT

A method of preparing a wind turbine blade, comprising: removing at least a portion of a layer of material covering a region of a metallic part of the wind turbine blade from the wind turbine blade, applying a metal salt to the metallic part, the metal salt being arranged to oxidise a metal of the metallic part, such that the metal salt and the metal of the metallic part react and a new compound is formed on the metallic part.

22 Claims, 8 Drawing Sheets

(52) U.S. Cl.
CPC ... *F05B 2230/80* (2013.01); *F05B 2280/1021* (2013.01); *F05B 2280/6003* (2013.01)

(58) Field of Classification Search
CPC ...... F05B 2280/1021; F05B 2280/6003; B29L 2031/085
See application file for complete search history.

(56) References Cited

FOREIGN PATENT DOCUMENTS

| WO | 2014012052 A1 | 1/2014 |
|----|---------------|--------|
| WO | 2019068294 A1 | 4/2019 |

OTHER PUBLICATIONS

European Patent Office, International Search Report and Written Opinion in PCT Application No. PCT/DK2020/050373, Mar. 11, 2021.

* cited by examiner

WIND TURBINE BLADE MANUFACTURE

FIELD OF THE INVENTION

The present invention relates to a method of preparing a wind turbine blade, a method of repairing a wind turbine blade, a kit of parts and a wind turbine blade.

BACKGROUND OF THE INVENTION

Wind turbine blades may be damaged or may be made with defects within a lightning protection system or other metallic part. In order to avoid discarding the entire blade, a damaged or defective portion of the metallic part may be removed and replaced by a new metallic portion. During such replacement, it may be advantageous to ensure that there is a good contact between the new metallic portion and the original metallic part which is undamaged and adjacent the damaged region which has been removed. In particular, it is desirable that a good quality electrical connection is formed between the new metallic portion and the original (undamaged) metallic part.

Electrical conductivity between the new metallic portion and the original metallic part may be reduced in cases where the existing part is covered by an insulative material and therefore complete removal, or at least a sufficient amount of removal, of the insulative material may be desirable before the replacement part is attached.

In cases where metallic meshes or portions thereof may be replaced, an uncertainty of quality of electrical contact between the original mesh and the replacement mesh may be addressed by limiting the size or number of replacement or repair areas on the mesh. There may be a limit on the size of a mesh replacement, and where such limitations cannot be satisfied complete replacement of the mesh may be required. This can add to maintenance costs significantly.

SUMMARY OF THE INVENTION

A first aspect of the invention provides a method of preparing a wind turbine blade, comprising: removing at least a portion of a layer of material covering a region of a metallic part of the wind turbine blade from the wind turbine blade, applying a metal salt to the metallic part, the metal salt being arranged to oxidise a metal of the metallic part, such that the metal salt and the metal of the metallic part react and a new compound is formed on the metallic part.

With such a method, a person preparing the wind turbine blade may more easily be able to observe the extent to which the layer of material has been removed and whether further removal of the material is necessary. The method may also provide an indication of how good a removal method of the material is.

The metal of the metal salt may be any one of: Chromium, Iron, Nickel, Tin, Copper, Silver and/or the metal salt may be a Halide, optionally a Chloride. The metal salt may be Ferric Chloride.

The new compound may be visibly different from the metal of the metallic part. The new compound may be a different colour from the metal of the metallic part. The new compound may, additionally or alternatively, have a lower reflectivity than the metal of the metal part.

The layer of material may comprise at least one of: epoxy resin, paint, fibre reinforced composite, gel coating.

The metallic part may be an electrically conductive mesh, layer, grid and/or sheet. The metallic part may be a surface protection layer of a lighting protection system of the wind turbine blade.

The metal of the metallic part may be aluminium.

Applying the metal salt may comprise applying a solution of the metal salt. The solution of the metal salt may be an aqueous solution.

The method may further comprise, subsequent to the applying of the metal salt, removing a further portion of the layer of material from the wind turbine blade.

The method may further comprise removing the new compound from the metallic part. Optionally, the removing may comprise mechanical abrasion and/or cutting of the new compound.

The method may further comprise, subsequent to the removing of the new compound: applying a further quantity of the metal salt to the metallic part, such that the further quantity of the metal salt and the metal of the metallic part react and a further quantity of the new compound is formed on the metal part.

According to a second aspect of the invention, there is provided a method of repairing a wind turbine blade comprising: removing a portion of a metallic part such that a void in the metallic part is formed, and preparing a region adjacent the void in accordance with the first aspect of the invention.

The region adjacent the void may surround the void.

The method may further comprise providing a second metallic part and covering the void with the second metallic part.

The method may further comprise covering the second metallic part with a layer of fibre reinforced composite material.

The method may further comprise fixing the second metallic part to the metallic part such that the metallic part and the second metallic part are in electrical communication.

The second metal part may be arranged to overlap and to contact the metal part at the region adjacent the void.

The method may further comprise fixing the metal part to the second metal part by a vacuum assisted resin transfer process.

According to a third aspect of the invention, there is provided a kit of parts comprising: a metal salt for application to a wind turbine blade, the metal salt being arranged to oxidise a metallic part of the wind turbine blade; and a replacement metallic part for attachment to the wind turbine blade.

According to a fourth aspect of the invention, there is provided: a wind turbine blade comprising: an externally exposed metallic part on an outer surface of a blade shell, the metallic part comprising a metal and a compound formed on the metallic part by a chemical reaction between the metal of the metallic part and a metal salt applied to the metallic part.

BRIEF DESCRIPTION OF THE DRAWINGS

Embodiments of the invention will now be described with reference to the accompanying drawings, in which.

DETAILED DESCRIPTION OF EMBODIMENTS

Figure 1:
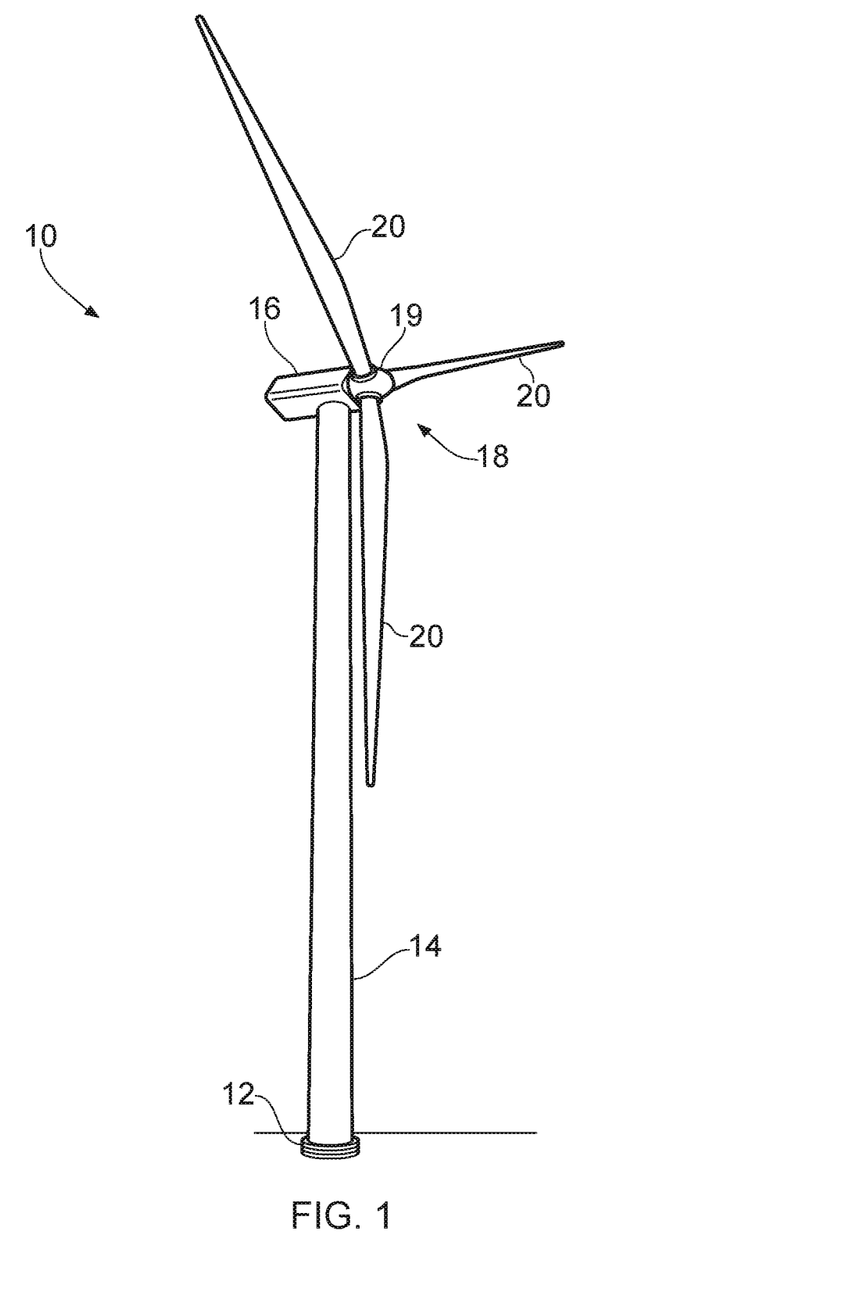
FIG. 1 shows a schematic drawing of a wind turbine.

FIG. 1 shows a wind turbine 10. The wind turbine has a main tower 14 extending upwardly from a foundation 12 and a nacelle 16 supported at the top of the main tower 14. Rotatably attached to the nacelle 16 is a rotor 18, which has a central hub 19 and wind turbine blades 20 extending radially outwardly from the hub 19.

When wind blows, the blades 20 are arranged to generate lift in order to rotate the rotor 18. The rotor 18 is coupled to a generator inside the nacelle 16, which is arranged to convert the rotary movement of the rotor 18 into electrical energy.

In order to protect the wind turbine blade 20 from lightning strikes, the blades may have a lightning strike protection system, which may include a surface protection layer near to the surface of the wind turbine blade and may also include a metallic tip or other discrete lightning receptors of the wind turbine blade. The surface protection layer may be in the form of a metallic mesh and may also be referred to or considered as a grid or a foil. More generally, a metallic sheet or layer may be used.

Figure 2A:
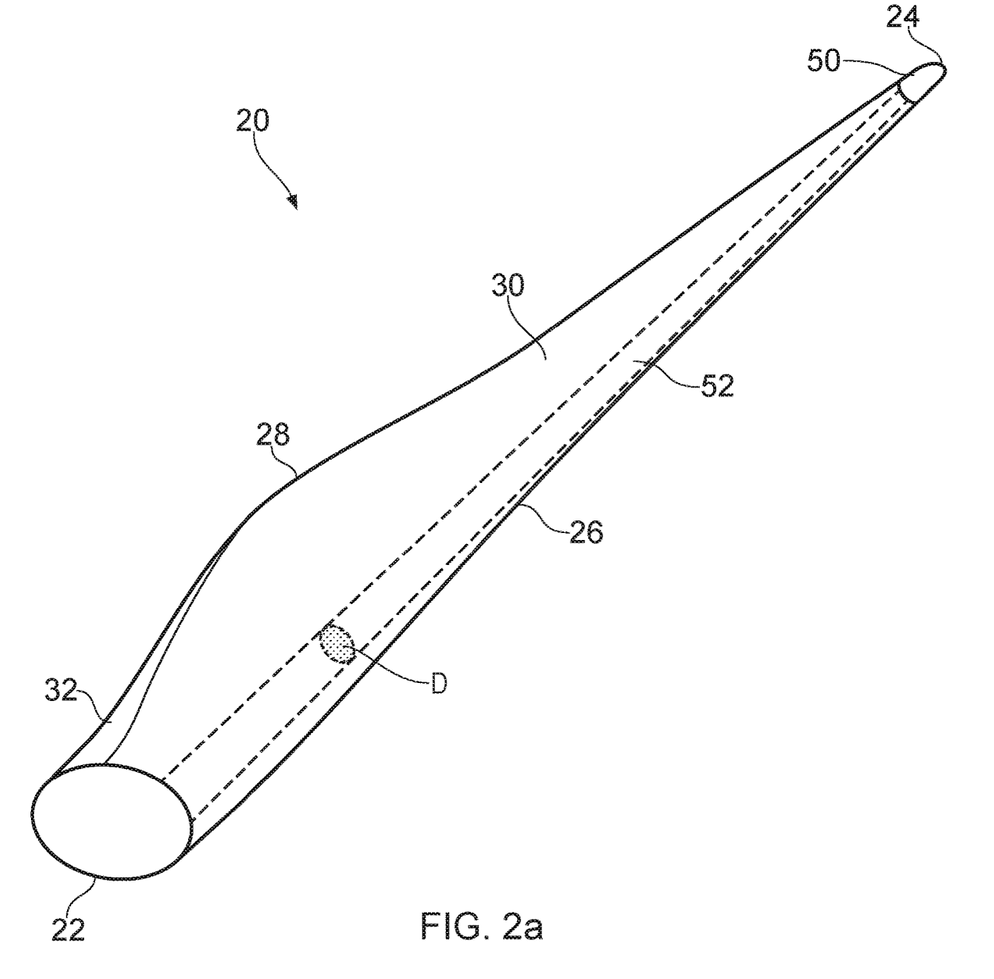
FIG. 2a shows a schematic drawing of a wind turbine blade.

FIG. 2*a* shows a wind turbine blade 20, the blade having a root end 22 and a tip end 24 as well as a leading edge 26 and trailing edge 28, a pressure surface 30 and a suction surface 32. At the tip 24 there is a metallic lightning receptor 50 and a metallic mesh 52, which may extend from the metallic lightning receptor 50 to the root end 22.

Alternatively, the metallic mesh 52 may extend only part of the way along the blade and may be electrically coupled to the root end 22 via a cable. As further options, there may be multiple meshes 52 in parallel and one or more cables may extend from the lightning receptor 50 to the root end 22 in parallel with the one or more meshes 52. The metallic mesh 52 may be under the surface of the wind turbine blade 20, and may be covered by a gel coat, a paint later and/or a layer of fibre glass.

Metallic meshes may incur damage or defects, as shown by the region D in FIG. 2*a*. The damage may be caused by impact to the blade surface, such as from birds or during transportation, lightning damage or may be a manufacturing defect. Other sources of defectiveness of or damage to metallic parts of wind turbine blade are problems during demoulding, a misplaced metallic mesh and grinding or sanding of the blade surface. While the damage D shown is on the pressure surface, it will be understood that any region of the blade, such as the suction surface may also be damaged or defective.

Figure 2B:
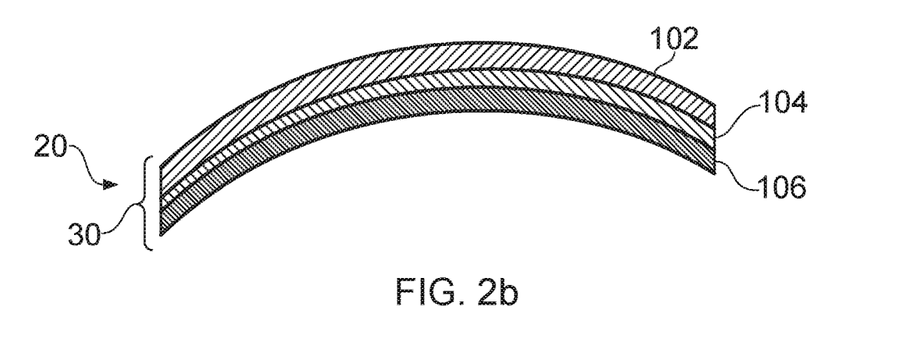
FIG. 2b shows a cross-section of a wind turbine blade.

FIG. 2*b* illustrates how the metallic mesh 104 may be arranged within the wind turbine blade 20. Specifically, FIG. 2*b* shows a cross-section of the shell of the wind turbine blade 20 at the pressure surface 30, although it will be understood that the suction surface 32 may have a similar structure. The shell has a structural substrate 106, which may be formed of a composite material such as carbon fibre or glass fibre reinforced plastic. A metallic mesh 104 may be arranged on top of the structural substrate 106 and a surface layer 102 may be arranged on top of the metallic mesh 104. The thicknesses of the layers shown in FIG. 2*b* are not to scale. It will be understood that the structural substrate 106 may have a greater thickness than the other two layers and that the metallic mesh 104 and the surface layer 102 may be thinner than the structural substrate 106. The blade 20 may also comprise a structural web or interior box section, which is not shown.

The surface layer 102 may comprise a composite material and may also comprise a paint or a gel coat layer.

The metallic mesh 104 is integrated into the blade shell. Typically, wind turbine blade shells are manufactured by placing the metallic mesh and dry fibrous material in a mould. The material may be infused with a polymer matrix material via a vacuum assisted resin transfer process (VARTM) as is well known in the art, to bond the components together and to result in the composite material. The polymer matrix may be an epoxy resin or polyester resin for example.

Figure 3A:
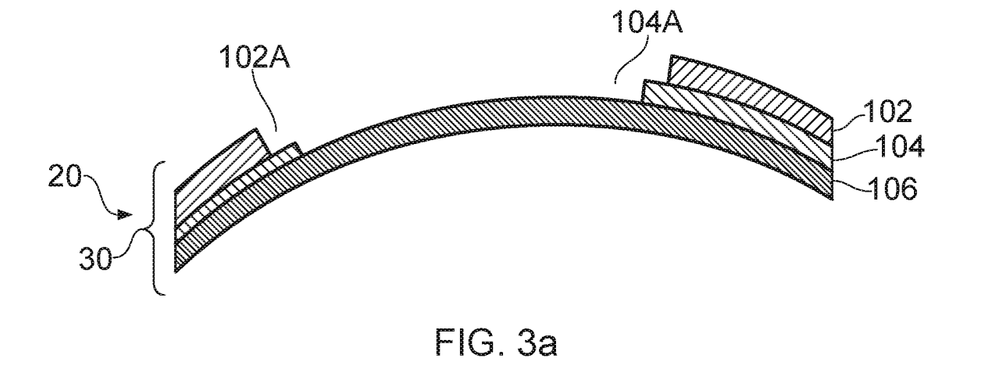
FIGS. 3a, 3b and 3c show a cross-section of a wind turbine at different stages in a repair process.

FIG. 3*a* shows a blade in an intermediate stage of repair, where the damaged portion of mesh D has been removed and also a portion of the surface layer 102 has been removed. The mesh 104 therefore has a void 104A formed within it and the outer surface layer 102 has a void 102A formed within it. The structural substrate 106 of the blade shell may be substantially unaffected during the repair. If the structural substrate is 106 is also damaged this may be repaired at this stage using known repair techniques which will not be described here.

Figure 3B:
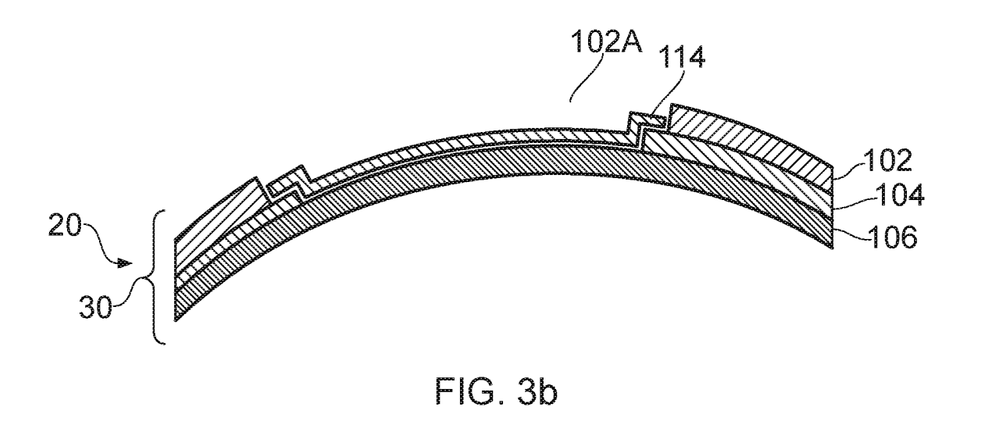

FIG. 3*b* shows the next step of the repair process, where a new, second metallic part 114, which is arranged to fill or cover the void 104A within the metallic mesh 104 and which may overlap a portion of the metallic mesh 104 is inserted into the blade 20. By the second metallic part 114 overlapping the metallic mesh 104, a good electrical connection may be made between the new metallic part 114 and the original metallic mesh 104.

Figure 3C:
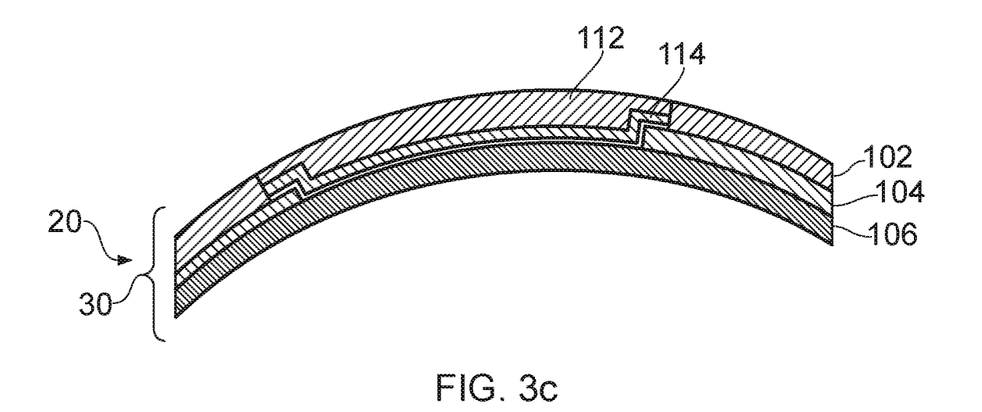

As shown in FIG. 3*c*, a new portion of the surface material 112 may be added on top of the second metallic part 114 in order to form a continuous and aerodynamically smooth outer surface of the shell. The new portion 112 of the surface material may also act to attach the new metallic part 114 to the original mesh 104 structurally.

In some cases, there may be surface contact but no direct mechanical attachment or fixing between the new metallic part 114 and the original metallic mesh 104 but the new metallic mesh 114 may be held in place by the outer surface material 112. The new metallic part 114 may be a metallic mesh having properties substantially similar to the original mesh 104. For example, the new and original meshes 114, 104 may be formed from the same material and may have the same grid spacing.

Figure 4A:
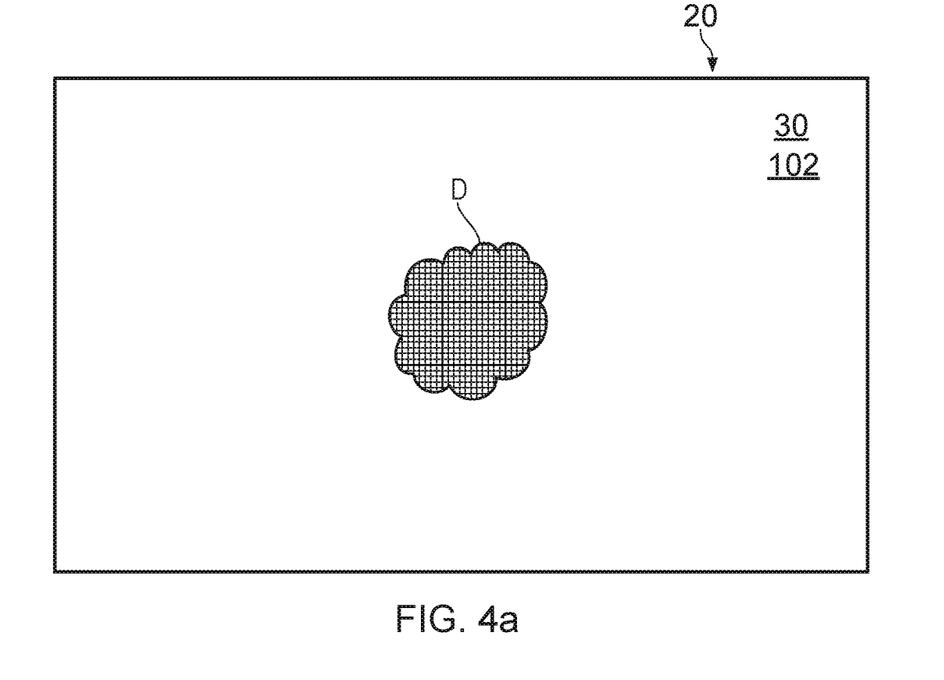
FIGS. 4a to 4j show plan views of a wind turbine blade during different stages of a preparing and repairing process.

FIG. 4*a* shows a plan view of a region of damage to a wind turbine blade 20. While the region of damage D is shown in FIG. 4*a*, the region of damage D may not necessarily be visible from the surface of the blade and may be a defect within the mesh 104.

Figure 4B:
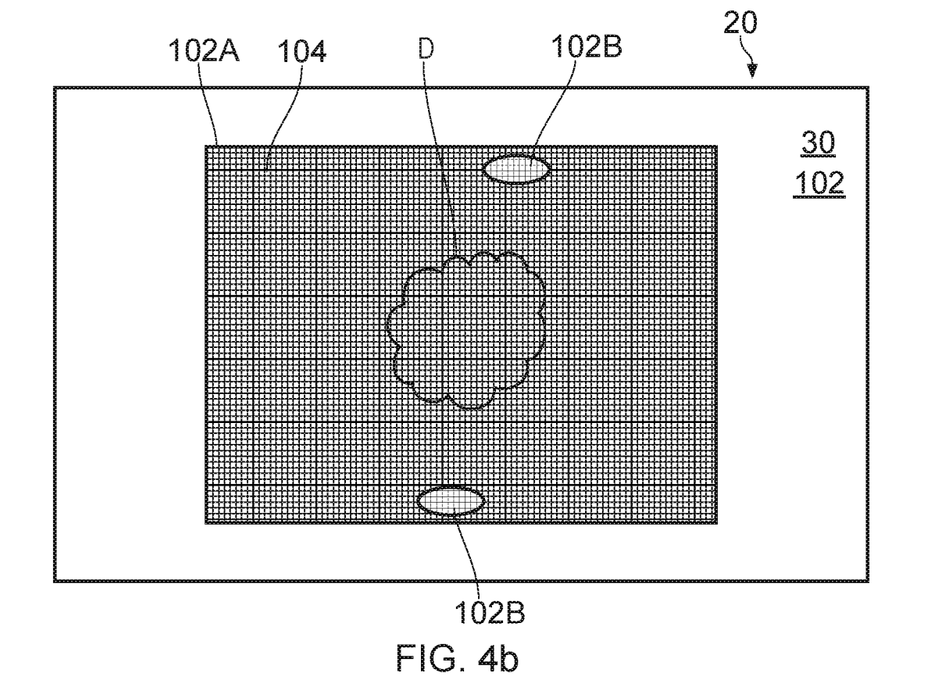

In FIG. 4*b*, a portion of the outer surface layer 102 has been removed to form a void 102A in the outer surface, meaning that the metallic mesh 104 is exposed and in particular the region of damage D is exposed. The removal of the portion of the outer surface layer 102 may be by abrasion.

However, the outer surface material 102 may not be completely removed and regions of material 102B may remain on the metallic mesh 104. The regions of material 102B that remain may comprise the polymer matrix.

Such regions of remaining material 102B may be difficult to observe with the naked eye, as they may be substantially transparent, e.g. the resin. These regions 102B may reduce the quality of electrical connection between the metallic mesh 104 and any subsequently applied metallic part 114. The presently disclosed method may thereby improve detection of such remaining portions of outer surface material 102B. Alternatively, if no regions of residual material 102B are present, the method disclosed below may provide confirmation of this.

Figure 4C:
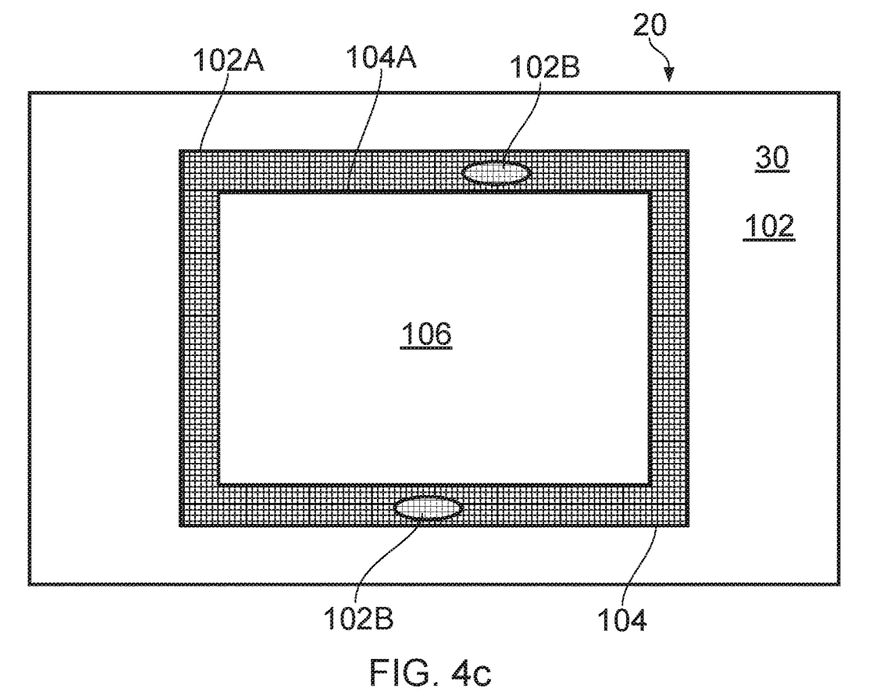

In FIG. 4*c*, it can be seen that the region of damage D has been removed so as to form a void 104A in the metallic mesh 104. This removal may be performed by cutting or grinding of the mesh 104. There may also be a region of the metallic mesh 104 which is exposed, i.e. not covered by the outer surface material 102 and which surrounds the void 104A in the metallic mesh. The structural substrate 106 of the blade 20 may therefore be externally visible at this stage.

Figure 4D:
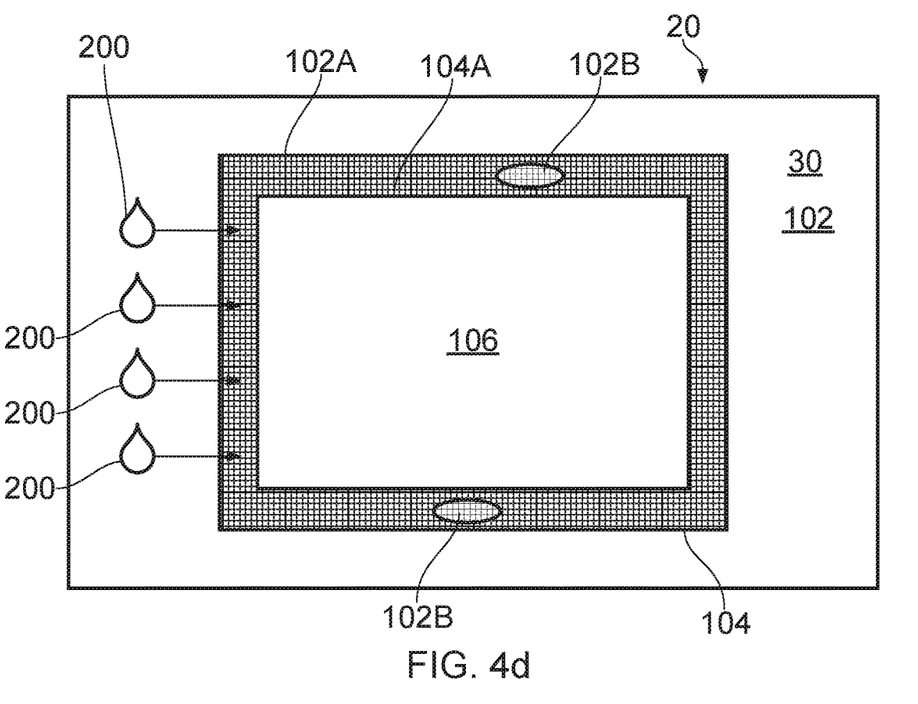

In FIG. 4d, an indicator fluid 200, which may comprise a metal salt in a solution, optionally an aqueous solution, may be applied to the exposed portion of the metallic mesh 104. The indicator fluid may be applied as a spray from a spray bottle or by a brush. Alternatively, a metal salt may be poured on as a powder.

The indicator fluid 200 may contain a metal salt arranged to oxidise the metallic mesh 104. In some examples this metal salt may be Ferric Chloride or may be a different halide. The metal salt may contain a metal which is less reactive than the metal of the metallic mesh 104. The metal salt may therefore be selected so that a compound may be formed between an anion of the metal salt and the metal of the metallic part 104, which is more stable than the metal salt of the indicator solution 200. The metallic mesh 104 may be Aluminium and therefore the metal salt in the indicator fluid 200 may be a metal less reactive than Aluminium. Alternatively, the metallic mesh 104 may be formed of steel or copper, in which case, metal salts formed with different metals may be suitable for use in the indicator fluid 200.

In the case where the metallic mesh 104 is formed from Aluminium, halides of any of Iron, Copper, Chromium, Nickel, Tin and Silver may be used as the metal salt. Other types of salt may also be used, such as Nitrates, Chromates and Hydroxides. Particular salts which may be used are Copper Hydroxide, Silver Nitrate, and Ferric Chloride.

The metal salts may be applied in a powder form or may be applied as an aqueous solution. Alternatively, different solvents may be used. Aqueous solutions are preferable as they are known not to affect epoxy resins, which may form structural parts of composite portions of the wind turbine blade, such as the structural substrate 106.

It is also preferable that a metal salt, which is non-toxic in the concentrations required for a visible chemical reaction to occur, is used and therefore Ferric Chloride is preferable. As an example, $FeCl_3 \cdot 6H_2O$ with a molecular weight of 270.30 g/mol is used.

Figure 4E:
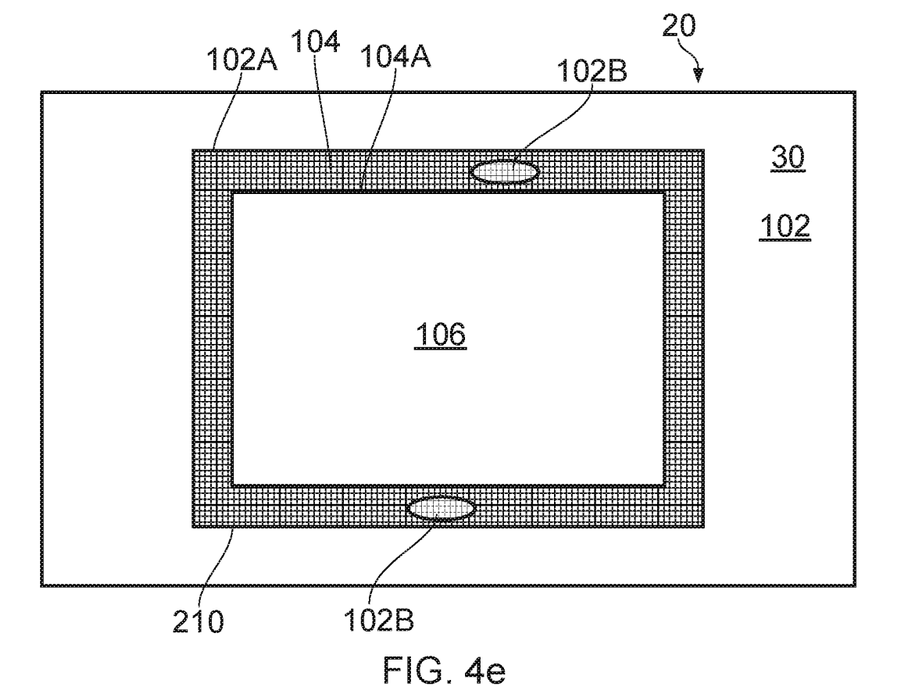

Once the indicator fluid 200 is applied to the mesh 104, a reaction may take place between the metal of the mesh 104 and the indicator fluid 200, and a new compound 210 may be formed. The reaction may take place over 1 minute or over a longer or shorter time period, depending on the concentration and the temperature of the indicator fluid 200. The indicator fluid may have a concentration of 200 grams of metal salt per litre, but it will be understood that higher or lower concentrations may be used.

The new compound may be of a different colour, a different texture, and/or a different reflectivity from the metal of the mesh 104. In the case of Ferric chloride, Aluminium Chloride will be formed as the new compound 210 on the mesh 104 and Aluminium Chloride has a darker appearance than elemental Aluminium and so the contrast between the exposed regions of the mesh 104 and the regions 102B covered by remnants of the outer surface layer 102 may be more easily visible. Aluminium Chloride may appear black as opposed to the metallic silver appearance of Aluminium.

While the Aluminium Chloride is visibly different from the mesh 104 to the naked eye, different new compounds 210 may also be formed, when different metal salts and/or different indicator fluids 200 are used, which may be visibly different under ultraviolet or infrared light.

Following the forming of the new compound 210, remaining portions of the outer surface layer 102 in the regions 102B may be removed.

The new compound 210, which may not be electrically conductive, may also be removed. Removal of the new compound 210 may involve grinding or abrasion, such as by a mechanical grinding or sanding disk or may involve cutting of the new compound 210 with a knife.

The new compound 210 may be a compound having a lower toughness than the metal and also a lower toughness than the surface layer material and may thereby be removed more easily from the mesh 104 than the outer layer 102 may be removed. Toughness is defined as the integral of the stress with respect to strain until rupture or yield of the material.

Figure 4F:
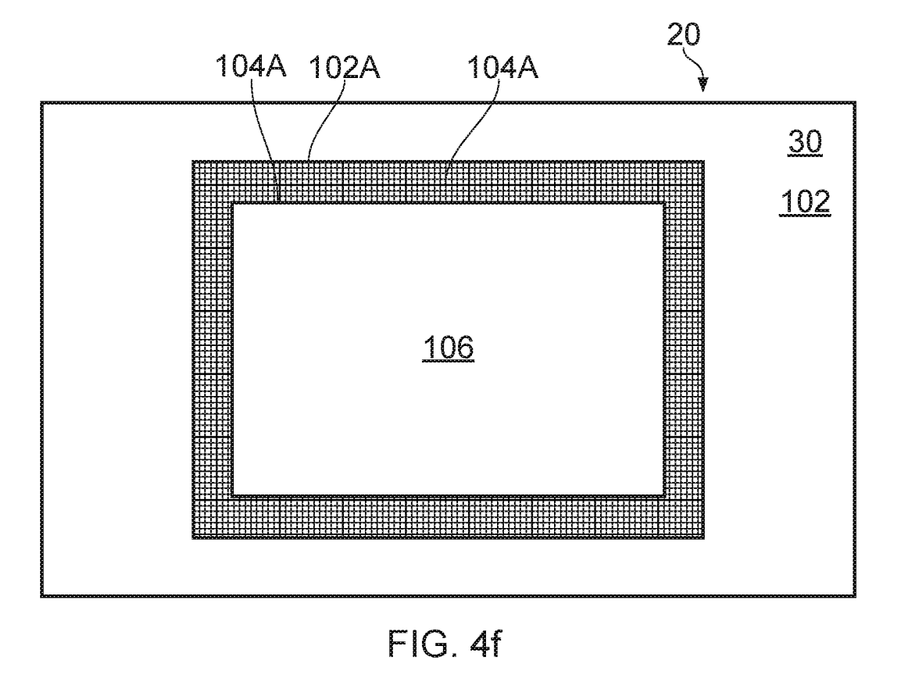

After removal of the new compound 210, a clear mesh region 104 may be formed, as shown in FIG. 4f. It will be understood that multiple iterations of addition of the indicator fluid 200 and removal of the new compound 210 and regions of the outer surface layer 102B may take place.

The mesh 104 may be cleaned after complete removal of the surface layer 102 has been performed. The mesh may be cleaned with alcohol and/or may be vacuumed to remove dust and/or debris.

Figure 4G:
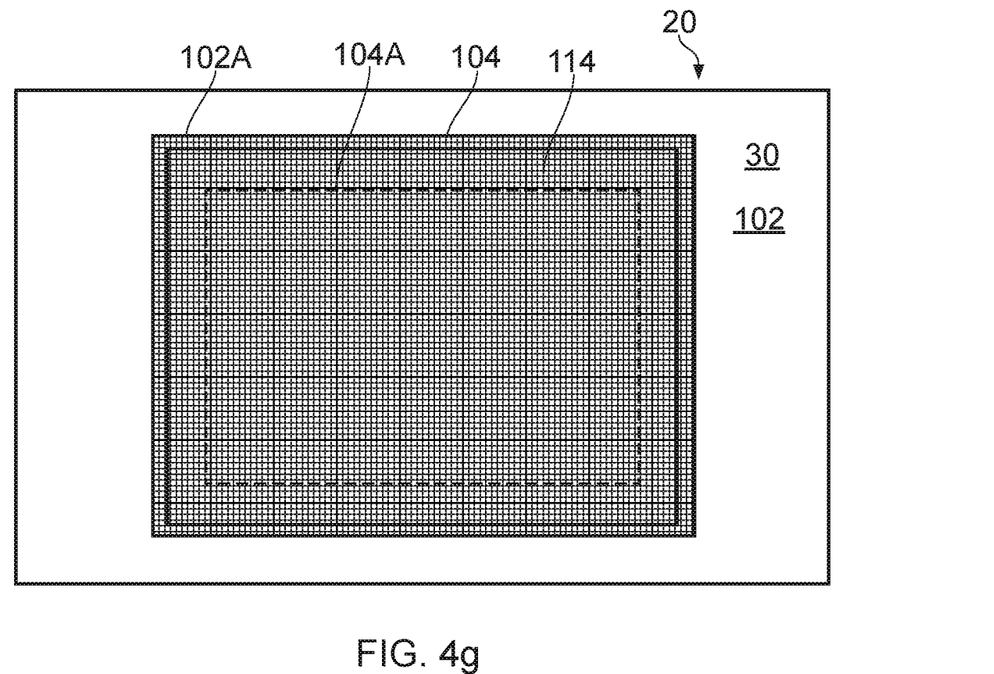

Once the mesh 104 has been prepared, a second metallic part 114 may be introduced and may overlap the region of the mesh 114 surrounding the void 104A and the second metallic part 114 may cover the entire void 104A. The overlap region may be 50 mm wide around the entire circumference of the void. The second metallic part 114 may be held in place using tape, optionally scrim tape.

As all the material 102B has been removed from the overlap region, there will be good electrical contact between the mesh 104 and the second metallic part 114.

Figure 4H:
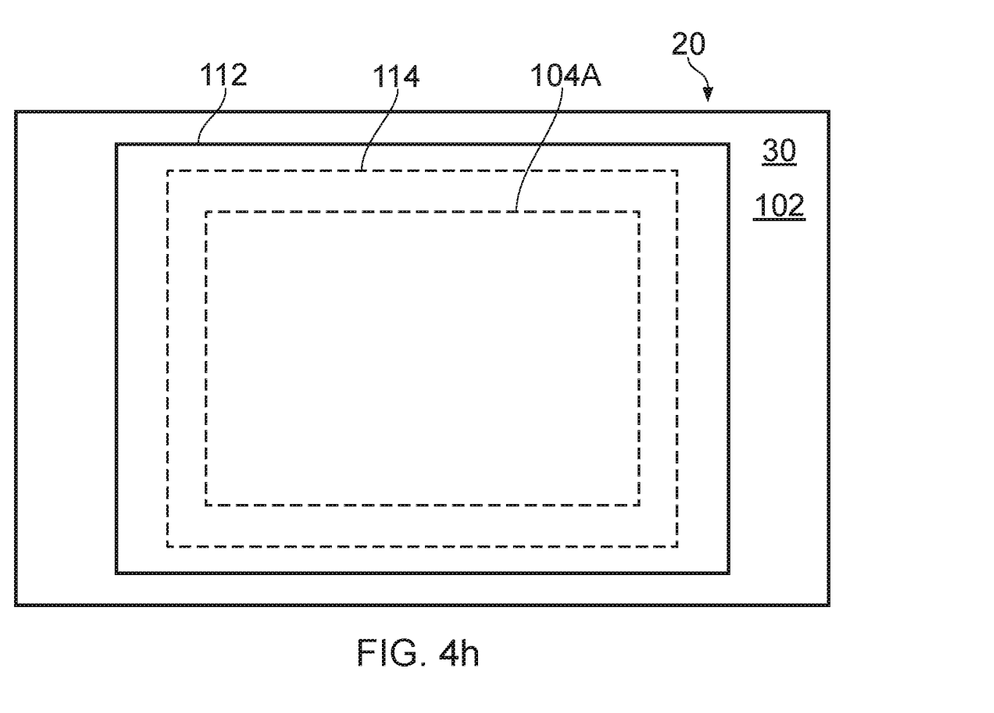

Next, a further outer surface layer portion 112 may be added to the blade in order to form an aerodynamically smooth outer surface with the outer layer 102. FIG. 4h shows the further outer surface layer portion 112 arranged to cover and to fill the void 102A in the outer surface layer 102.

Figure 4I:
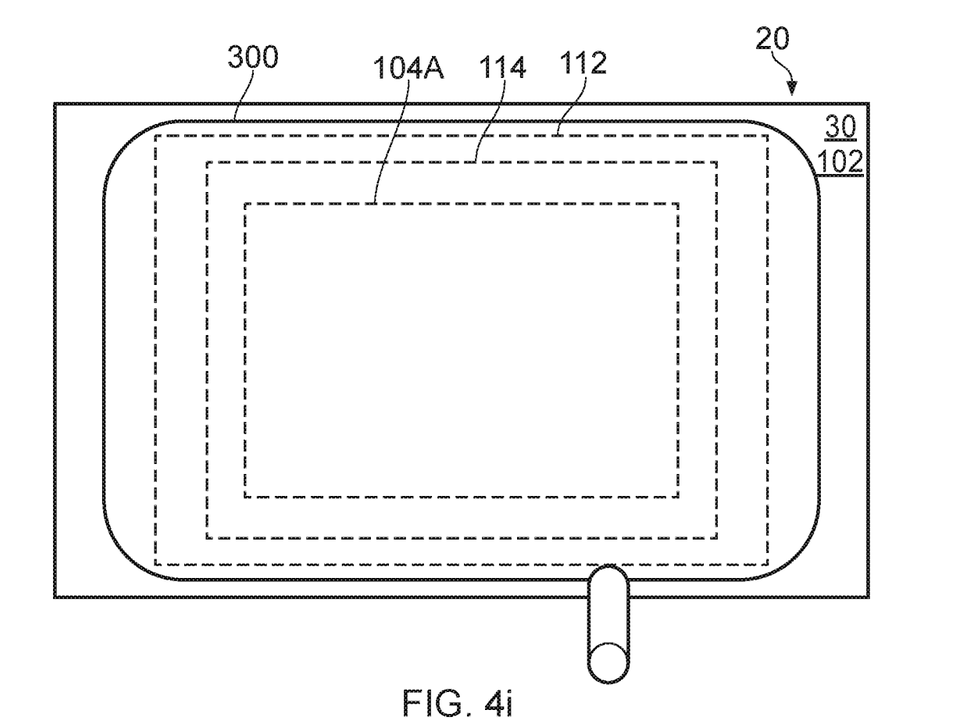

The new portion of the outer layer 112 may be fixed to the blade 20 via a vacuum assisted resin transfer process (VARTM) and so a vacuum bag 300 may be applied over the new portion of the outer surface 112 as shown in FIG. 4i.

Figure 4J:
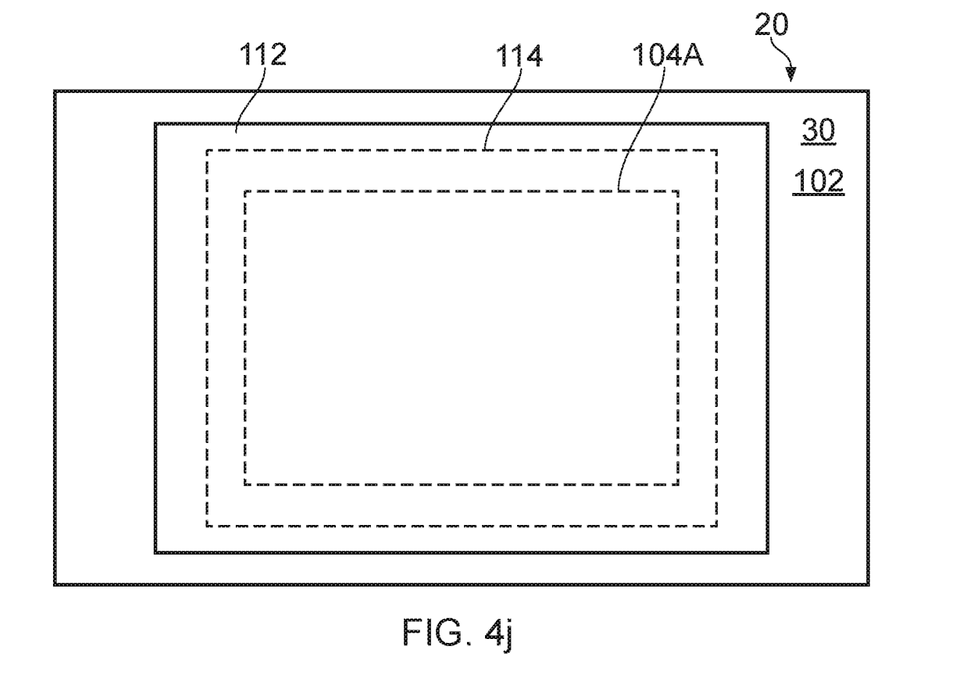

Subsequently, the vacuum bag 300 may be removed and a new blade surface may be formed as shown in FIG. 4j. The blade surface shown in FIG. 4j may be substantially similar to that shown in cross section in FIG. 3c. Sanding or other surface processing may subsequently be performed in order to produce an aerodynamically smooth surface.

Although the invention has been described above with reference to one or more preferred embodiments, it will be appreciated that various changes or modifications may be made without departing from the scope of the invention as defined in the appended claims.

The invention claimed is:

1. A method of preparing a wind turbine blade, comprising:
    removing at least a portion of a layer of material covering a region of a metallic part of the wind turbine blade from the wind turbine blade,
    applying a metal salt to the metallic part, the metal salt being arranged to oxidise a metal of the metallic part, such that the metal salt and the metal of the metallic part react and a new compound is formed on the metallic part.

2. The method of claim 1, wherein the metal of the metal salt is one of: Chromium, Iron, Nickel, Tin, Copper, Silver.

3. The method of claim 1, wherein the metal salt is a halide.

4. The method of claim 3, wherein the metal salt is a chloride.

5. The method of claim 1, wherein the new compound is visibly different from the metal of the metallic part.

6. The method of claim 5, wherein the new compound is a different colour from the metal of the metallic part.

7. The method of claim 1, wherein the layer of material comprises at least one of: epoxy resin, paint, fibre-reinforced composite, gel coating.

8. The method of claim 1, wherein the metallic part is an electrically conductive mesh, layer, grid and/or sheet.

9. The method of claim 1, wherein the metallic part is a surface protection layer of a lightning protection system of the wind turbine blade.

10. The method of claim 1, wherein the metal of the metallic part is Aluminum.

11. The method of claim 1, wherein applying the metal salt comprises applying a solution of the metal salt.

12. The method of claim 1, further comprising, subsequent to the applying of the metal salt: removing a further portion of the layer of material from the wind turbine blade.

13. The method of claim 1, further comprising removing the new compound from the metallic part.

14. The method of claim 13, wherein the removing comprises mechanical abrasion and/or cutting of the new compound.

15. The method of claim 13, further comprising, subsequent to the removing of the new compound: applying a further quantity of the metal salt to the metallic part, such that the further quantity of the metal salt and the metal of the metallic part react and a further quantity of the new compound is formed on the metal part.

16. A method of repairing a wind turbine blade, comprising:
    removing a portion of a metallic part such that a void in the metallic part is formed, and
    preparing a region adjacent the void according to the method defined in claim 1.

17. The method of claim 16, wherein the region adjacent the void surrounds the void.

18. The method of claim 16, further comprising providing a second metallic part and covering the void with the second metallic part.

19. The method of claim 18, further comprising covering the second metallic part with a layer of fibre-reinforced composite material.

20. The method of claim 19, further comprising affixing the second metallic part to the metallic part such that the metallic part and the second metallic part are in electrical communication.

21. The method of claim 18, wherein the second metal part is arranged to overlap and to contact the metal part at the region adjacent the void.

22. The method of claim 18, further comprising affixing the metal part to the second metal part by a vacuum-assisted resin transfer process.

\* \* \* \* \*